UNITED STATES PATENT OFFICE.

RUPERT GREVILLE WILLIAMS, OF ALBANY, NEW YORK.

NEW COLORING-MATTER OBTAINED BY THE ACTION OF TETRAZO-DIAMIDO BENZOLE ON PHENOLS.

SPECIFICATION forming part of Letters Patent No. 384,342, dated June 12, 1888.

Application filed November 17, 1887. Serial No. 255,400. (No specimens.)

*To all whom it may concern:*

Be it known that I, RUPERT GREVILLE WILLIAMS, a subject of Her Majesty the Queen of Great Britain, and a resident of Albany, in the county of Albany and State of New York, have invented certain new and useful Improvements in the Manufacture of Coloring-Matter, of which the following is a specification.

My invention relates to the production of coloring-matters obtained by the action of tetrazo-diamido benzole (hydrochlorate) and its homologues on resorcin, the phenols, benzoic, the oxybenzoic acids, and alpha-naphthol and their substitution products, by which coloring-matters soluble in alkalies, but insoluble in dilute acids, are obtained; on aniline and its homologues beta-naphthol, the naphthylamines and their substitution products, by which coloring matters insoluble both in alkalies and dilute acids are obtained, and on the sulpho acids of all the above amines, amides, and phenols, and their substitution products, by which coloring-matters extremely soluble in dilute alkalies are obtained.

As an example as to the manner of carrying out my invention practically, I obtain a brown coloring-matter by dissolving 10.8 pounds of phenyline-diamine or the proper quantity of its homologues in one hundred and eighty pounds of water and seventy pounds of muriatic acid of 22° Baumé. I then cool the solution to 10° centigrade. A solution of fourteen pounds of nitrite of sodium in five times its weight of water is then slowly run into the above acid solution of phenyline diamine hydrochlorate, care being taken that the temperature does not rise. The clear reddish-brown solution of the tetrazo-diamido benzole hydrochlorate thus obtained is run into twenty-two pounds of resorcin and one hundred and twenty pounds of acetate of soda dissolved in one thousand pounds of water. The brown coloring-matter is at once precipitated, and as soon as all the the free mineral acid is taken up, which is generally after the lapse of a few hours, the color may be filtered off, and, if necessary, purified in the usual manner.

This color is in the form of a reddish-brown powder, and is insoluble in dilute acids or water, but soluble in alkalies.

What I claim as new, and desire to secure by Letters Patent, is—

The new coloring-matters obtained by the action of tetrazo-diamido benzole (hydrochlorate) or its homologues on resorcin, the phenols, benzoic, the oxybenzoic acids, and alpha-naphthol, or their substitution products, on aniline and its homologues, beta-naphthol and the napthylamines, or their substitution products, and on the sulpho-acids of the above amines, amides, and phenols, or their substitution products, which coloring-matters have the properties herein set forth.

Signed at New York, in the county of New York and State of New York, this 14th day of November, A. D. 1887.

RUPERT GREVILLE WILLIAMS.

Witnesses:
CHAS. C. GILL,
ROBERT A. PORTEOUS.

It is hereby certified that in Letters Patent No. 384,342, granted June 12, 1888, upon the application of Rupert Greville Williams, of Albany, New York, for an improvement in "New Coloring-Matter Obtained by the Action of Tetrazo-Diamido Benzole on Phenols," an error appears in the printed specification requiring correction, as follows: In line 33 the clause "to 10° centigrade," should read *to —10° centigrade;* and that the Letters Patent should be read with this correction therein that the same may conform to the record of the case in the Patent Office.

Signed, countersigned, and sealed this 3d day of July, A. D. 1888.

[SEAL.]

D. L. HAWKINS,
*Assistant Secretary of the Interior.*

Countersigned:
BENTON J. HALL,
*Commissioner of Patents.*